(12) United States Patent
Takeno

(10) Patent No.: US 9,569,665 B2
(45) Date of Patent: Feb. 14, 2017

(54) COMMODITY RECOGNITION APPARATUS

(71) Applicant: TOSHIBA TEC KABUSHIKI KAISHA, Shinagawa-ku, Tokyo (JP)

(72) Inventor: Yuishi Takeno, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/537,963

(22) Filed: Nov. 11, 2014

(65) Prior Publication Data
US 2015/0139493 A1    May 21, 2015

(30) Foreign Application Priority Data

Nov. 20, 2013  (JP) ................................. 2013-240021

(51) Int. Cl.
*G06K 9/00* (2006.01)
*G07G 1/00* (2006.01)

(52) U.S. Cl.
CPC ....... *G06K 9/00624* (2013.01); *G06K 9/00912* (2013.01); *G07G 1/0063* (2013.01); *G06K 2209/17* (2013.01)

(58) Field of Classification Search
CPC .. G06K 9/78; G06K 9/00671; G06K 9/00362; G06K 9/036; G06Q 30/0643; G06Q 30/0641
See application file for complete search history.

(56) References Cited

U.S. PATENT DOCUMENTS

| | | | |
|---|---|---|---|
| 6,236,736 B1* | 5/2001 | Crabtree | G01S 3/7865 235/383 |
| 9,239,943 B2* | 1/2016 | Svetal | G06K 7/1447 |
| 2009/0039164 A1* | 2/2009 | Herwig | G07G 1/14 235/462.41 |
| 2009/0194593 A1* | 8/2009 | Kurihara | G07G 3/006 235/462.41 |
| 2010/0103241 A1* | 4/2010 | Linaker | G06Q 30/06 348/14.02 |
| 2011/0147454 A1* | 6/2011 | Matsuhisa | G06K 7/10861 235/383 |
| 2012/0099756 A1* | 4/2012 | Sherman | G06Q 30/06 382/100 |
| 2013/0101168 A1 | 4/2013 | Naito et al. | |
| 2014/0064569 A1* | 3/2014 | Sugasawa | G06K 9/00671 382/110 |

* cited by examiner

*Primary Examiner* — Stephen R Koziol
*Assistant Examiner* — Jonathan S Lee
(74) *Attorney, Agent, or Firm* — Amin, Turocy & Watson LLP; Gregory Turocy

(57) ABSTRACT

In accordance with one embodiment, a commodity recognition apparatus detects, from a captured image, an object imaged in the captured image and extracts an appearance feature amount of the object from the image of the object; compares the extracted appearance feature amount with feature amount data of a dictionary file in which feature amount data indicating the surface information of a commodity is stored for each recognition target commodity to calculate a similarity degree indicating how similar the appearance feature amount is to the feature amount data for each recognition target commodity; recognizes whether or not the object is a commodity based on the calculated similarity degree; and specifies and notifies the reason in a case in which the object is not recognized as a commodity.

10 Claims, 7 Drawing Sheets

COMMODITY RECOGNITION APPARATUS

CROSS-REFERENCE TO RELATED APPLICATION

This application is based upon and claims the benefit of priority from Japanese Patent Application No. 2013-240021, filed Nov. 20, 2013, the entire contents of which are incorporated herein by reference.

FIELD

Embodiments described herein relate generally to a commodity recognition apparatus which recognizes a commodity from a captured image and a commodity recognition method for enabling a computer to function as the commodity recognition apparatus.

BACKGROUND

There is a technology in which an object is recognized according to a similarity degree calculated by extracting an appearance feature amount of the object from the image data of the object photographed by an image capturing section and comparing the extracted appearance feature amount with the feature amount data of a reference image of each object pre-registered in a recognition dictionary file. Such a technology is called as a general object recognition, and various recognition technologies are disclosed in the following document.

Keiji Yanai "Current status and future direction of general object recognition", Journal of Information Processing Society, Vol. 48, No. SIG16 [Search on Heisei 22 August 10], Internet <URL:http://mm.cs.uec.ac.jp/IPSJ-TCVIM-Yanai.pdf>

In addition, the technology carrying out the general object recognition by area division of the image for each object is described in the following document.

Jamie Shotton etc, "Semantic Texton Forests for Image Categorization and Segmentation", [Search on Heisei 22 August 10], Internet <URL:http://citeseerx.ist.psu.edu/viewdoc/download?doi=10.1.1.145.3036&rep=repl&type=pdf>

In recent years, for example, the general object recognition technology described above is proposed to be applied to a recognition apparatus for recognizing a commodity, especially a commodity on which a barcode is not applied, such as vegetables, fruits and the like purchased by a customer in a checkout system (POS system) of a retail store. In this case, an operator (a shop clerk or a customer) holds the recognition target commodity over the image capturing section. In this way, in the commodity recognition apparatus, the commodity is recognized from a captured image and the information (for example, a commodity name) indicating the recognition result is displayed on a display section.

However, the commodity is not always recognized. For example, there is a case in which the commodity is not recognized because the commodity is shield by the hand of the operator. Alternatively, there is a case in which the commodity is not recognized because the similar feature amount data is not registered in the recognition dictionary file. Further, there is a case in which the commodity is not recognized because the commodity recognition program is frozen.

The commodity recognition apparatus has no reaction in a case in which the commodity is not recognized. As a result, it is difficult to determine the reason why the commodity is not recognized, and most operators feel stress because they tried to change the position and the direction to hold the commodity.

DETAILED DESCRIPTION

In accordance with one embodiment, a commodity recognition apparatus comprises a recognition module, a specification module and a notification module. The recognition module recognizes, from a captured image, a commodity imaged in the captured image. The specification module specifies the reason in a case in which the commodity cannot be recognized by the recognition module. The notification module notifies an operator of the reason specified by the specification module.

Hereinafter, the embodiment of the commodity recognition apparatus is described with reference to the accompanying drawings. In the present embodiment, a scanner device 1 constituting a store checkout system of a retail store which deals in vegetables, fruits and the like is provided with the functions of the commodity recognition apparatus.

Figure 1:
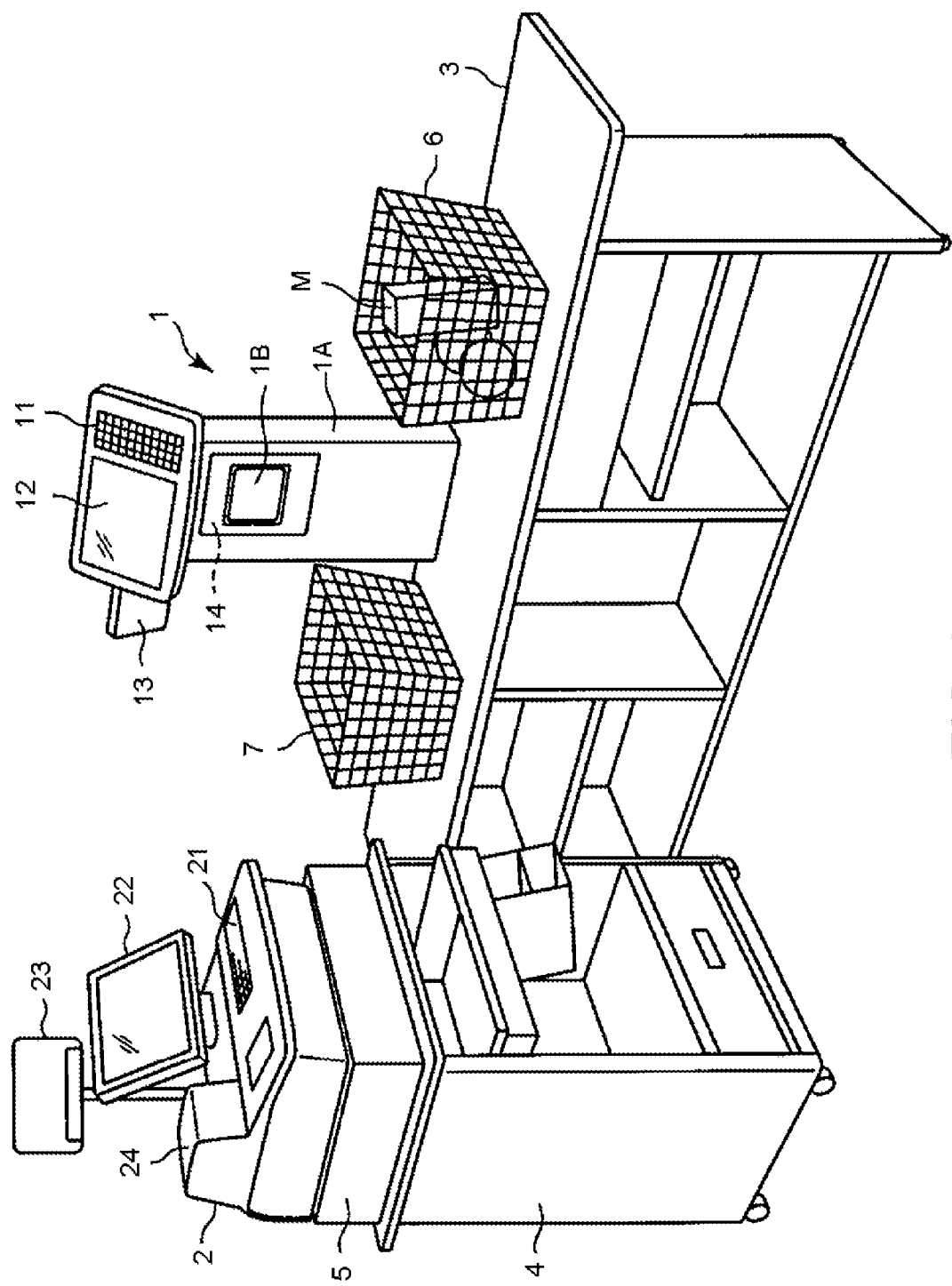
FIG. 1 is an external view of a store checkout system.

FIG. 1 is an external view of the store checkout system. The system includes the scanner device 1 serving as a registration section for registering a commodity to be purchased by a customer and a POS (Point Of Sales) terminal 2 serving as a settlement section for processing the payment of the customer. The scanner device 1 is arranged on a checkout counter 3. The POS terminal 2 is arranged on a register table 4 across a drawer 5. The scanner device 1 and the POS terminal are electrically connected with each other through a communication cable 300 (refer to FIG. 2).

The scanner device 1 is provided with a keyboard 11, a touch panel 12 and a customer display 13 as the devices required for the reading of the commodity. These display/operation devices are arranged on a thin rectangular housing 1A constituting a main body of the scanner device 1.

An image capturing section 14 is arranged inside the housing 1A. A rectangular-shaped reading window 1B is formed at the front side of the housing 1A. The image capturing section 14 includes a CCD (Charge Coupled Device) image capturing element as an area image sensor and a drive circuit thereof, and an image capturing lens for focusing the image of an image capturing area on the CCD image capturing element. The image capturing area refers to an area of a frame image focused on the area of the CCD image capturing element through the image capturing lens from the reading window 1B. The image capturing section 14 outputs the image of the image capturing area focused on the CCD image capturing element through the image capturing lens. The image capturing section 14 may be a CMOS (complementary metal oxide semiconductor) image sensor.

The POS terminal 2 is provided with a keyboard 21, an operator display 22, a customer display 23 and a receipt printer 24 as the devices required for the settlement. The keyboard 21, the operator display 22 and the customer display 23 within these devices are arranged on a housing constituting a main body of the POS terminal 2. The receipt printer 24 is arranged inside the housing, and a receipt printed by the printer is issued from a receipt issuing port formed at the front side of the housing.

The checkout counter 3 is in an elongated shape along a customer passage at the rear side thereof. The register table 4 is arranged at a side opposite to the customer passage with respect to the checkout counter 3 at a substantially right angle to the checkout counter 3. Specifically, the register table 4 is located at the end of the checkout counter 3 at the downstream side of a movement direction of a customer moving along the checkout counter 3. Therefore, the checkout counter 3 and the register table 4 are arranged in an L-shape to define a space for a shop clerk in charge of settlement, i.e., so called cashier.

At the approximate center of the checkout counter 3, the housing 1A of the scanner device 1 is vertically arranged such that the keyboard 11, the touch panel 12 and the reading window 1B are directed to the space for a shop clerk (cashier). The display for customer 13 of the scanner device 1 is arranged on the housing 1A, facing to the customer passage.

A first upper surface portion of the checkout counter 3 at the upstream side thereof through the scanner device 1 in the customer movement direction serves as a space for placing a shopping basket 6 in which an unregistered commodity M purchased by a customer is held. On the other side, a second upper surface portion at the downstream side through the scanner device 1 serves as another space for placing a shopping basket 7 in which a commodity M registered by the scanner device 1 is held.

Figure 2:
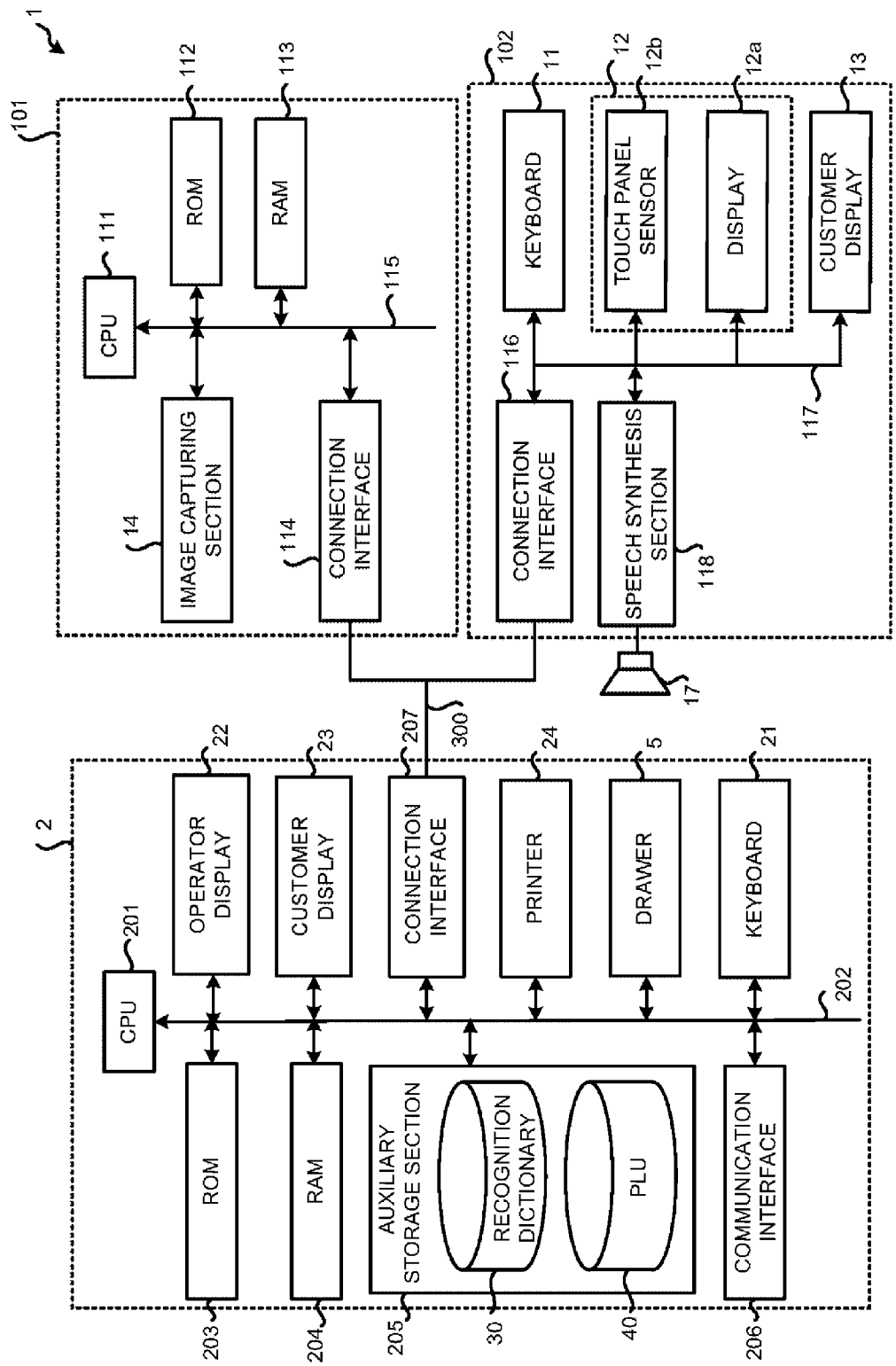
FIG. 2 is a block diagram illustrating the hardware constitution of a scanner device and a POS terminal.

FIG. 2 is a block diagram illustrating the hardware constitutions of the scanner device 1 and the POS terminal 2. The scanner device 1 comprises a scanner section 101 and an operation-output section 102. The scanner section 101 includes a CPU (Central Processing Unit) 111, a ROM (Read Only Memory) 112, a RAM (Random Access Memory) 113 and a connection interface 114 which are connected with each other via a bus line 115 including an address bus and a data bus. The scanner section 101 further connects the image capturing section 14 with the bus line 115 through an input/output circuit (not shown).

The CPU 111 is a central part of a computer. The CPU 111 controls each section to achieve various functions of the scanner device 1 according to an operating system or an application program.

The ROM 112 is a main storage part of the computer. The ROM 112 stores the operating system and the application program mentioned above. As occasion demands, ROM 112 also stores data required to execute various processing by the CPU 111.

The RAM 113 is also a main storage part of the computer mentioned above. The RAM 113 stores data required to execute various processing by the CPU 111 as needed. Further, the RAM 113 is also used as a work area for the CPU 111 when various processing, for example, the processing of storing the frame image captured by the image capturing section 14, is executed.

The operation-output section 102 includes a connection interface 116. The operation-output section 102 connects a bus line 117 with the connection interface 116, and connects the keyboard 11, the touch panel 12 and the display for customer 13 with the bus line 117 through an input/output circuit (not shown) to realize the functions of the operation-output section 102. The touch panel 12 includes a panel type display 12a and a touch panel sensor 12b overlaid on the screen of the display 12a. The operation-output section 102 further connects a speech synthesis section 118 with the bus line 117. The speech synthesis section 118 outputs a speech or voice signal to a speaker 17 in response to a command input via the bus line 117. The speaker 17 converts the voice signal into a voice to output it.

The connection interface 114 of the scanner section 101 and the connection interface 116 of the operation-output section 102 are connected with each other through the communication cable 300. Through the connection, the data signal from the scanner section 101 is sent to the operation-output section 102, and the operation of the operation-output section 102 is controlled.

The POS terminal 2 also carries a CPU 201 as a main body of the control section. The CPU 201 is connected with a ROM 203, a RAM 204, an auxiliary storage section 205, a communication interface 206 and a connection interface 207 via a bus line 202. In addition, the keyboard 21, display for operator 22, display for customer 23, printer 24 and drawer 5 are respectively connected with the bus line 202 via an input-output circuit (not shown).

The communication interface 206 is connected with a store server (not shown) serving as a center of the store via a network such as a LAN (Local Area Network) and the like. Through this connection, the POS terminal 2 can perform a transmission/reception of data with the store server.

The connection interface 207 is connected with the two connection interfaces 114 and 116 of the scanner apparatus 1 via a communication cable 300. Through the connection, the POS terminal 2 receives information from the scanner section 101 of the scanner apparatus 1. On the other hand, the scanner apparatus 1 accesses the data file stored in the auxiliary storage section 205 of the POS terminal 2.

The auxiliary storage section 205, which is, for example, a HDD (Hard Disk Drive) device or a SSD (Solid State Drive) device, further stores data files such as a recognition dictionary file 30, a PLU file 40 and the like, in addition to various programs.

Figure 3:
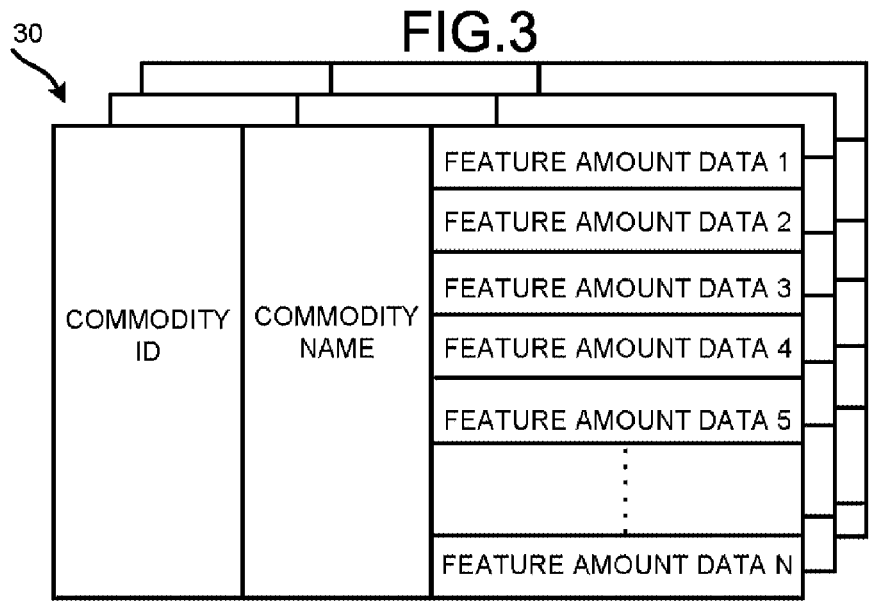
FIG. 3 is a schematic view illustrating the structure of dictionary data for each commodity stored in a recognition dictionary file.

FIG. 3 is a schematic view illustrating the structure of the dictionary data for each commodity stored in the recognition dictionary file 30. As shown in FIG. 3, a plurality of feature amount data are stored in the recognition dictionary file 30 for each recognition target commodity in association with a commodity name and a commodity ID for identifying the commodity. The feature amount data is obtained by extracting, from a reference image obtained by photographing a commodity identified with the corresponding commodity ID, an appearance feature amount serving as the surface information (appearance shape, tint, pattern, and concave-convex state and the like) of the commodity, and representing the appearance feature amount in the form of parameters. Feature amount data 1-N obtained when a commodity is observed from various directions are respectively stored for the commodity. The number N of feature amount data for one commodity is not fixed. The number N of feature amount data is different from one another according to commodity. In addition, the commodity name is not necessarily contained in the dictionary data for each commodity.

The PLU file 40 stores commodity data such as a unit price serving as the price per unit in association with the commodity ID of each commodity. When the commodity ID of a commodity for sale is specified in the scanner device 1, the CPU 201 reads the unit price associated with the commodity ID from the PLU file 40 and registers the sales data of the commodity for sale with the unit price. Further, it is possible to collectively manage the dictionary data for each commodity stored in the recognition dictionary file 30 and the data for each commodity stored in the PLU file 40 in one data file.

In the store checkout system with such a constitution, the image capturing section 14 of the scanner device 1 functions as an image capturing module for photographing the commodity held over the reading window 1B by the operator (shop clerk). The touch panel 12 functions as a display module for displaying the image captured by the image capturing module (image capturing section 14). The CPU 111 functions as a detection module, an extraction module, a calculating module, the recognition module, the specification module and the notification module.

The detection module detects, from an image captured by the image capturing section 14, an object imaged in the image. The extraction module analyzes the image of the object detected from the captured image and extracts the appearance feature amount of the object. The calculating module compares the appearance feature amount of the object extracted from the object image with the feature amount data of each recognition target commodity stored in the recognition dictionary file 30 to calculate, for each recognition target commodity, a similarity degree indicating how similar the appearance feature amount is to the feature amount data. The recognition module recognizes, from the captured image, the commodity imaged in the captured image based on the calculated similarity degree for each recognition target commodity. The specification module specifies the reason in a case in which the commodity cannot be recognized. The notification module notifies the operator of the reason specified by the specification module.

Figure 4:
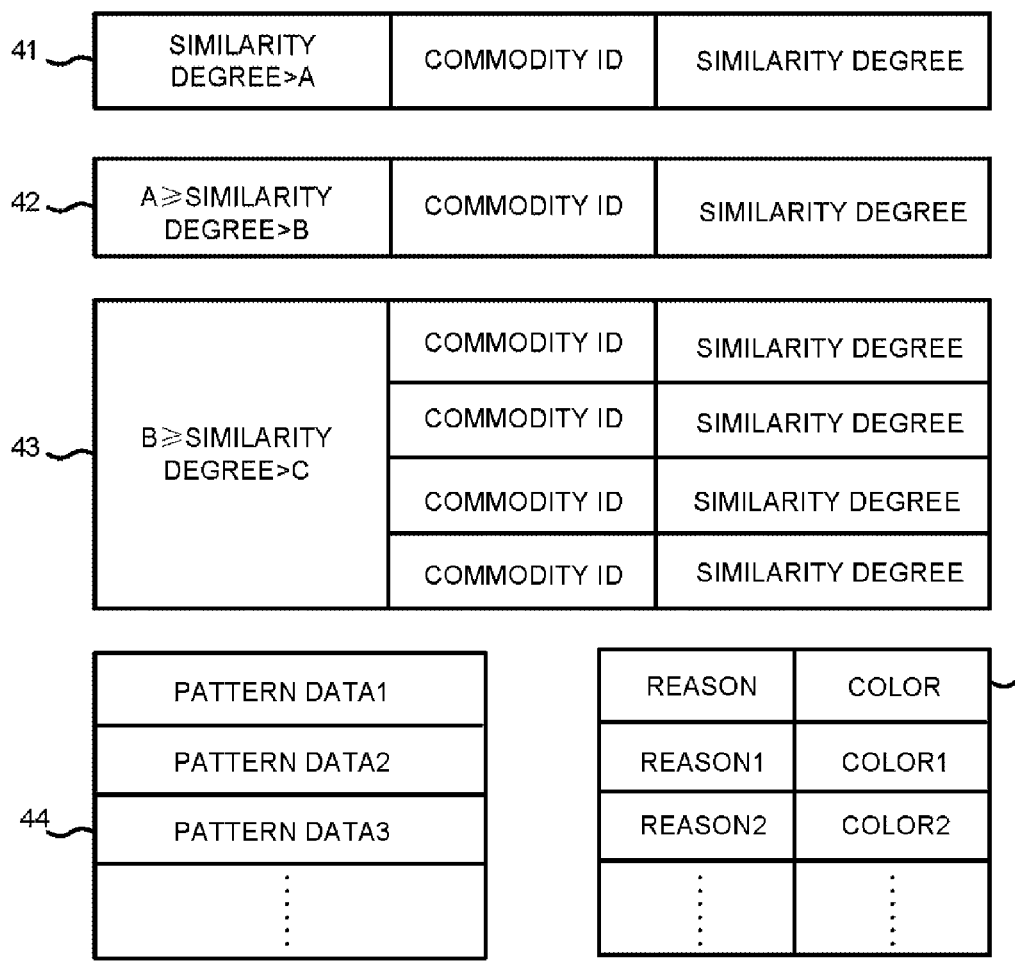
FIG. 4 is a schematic view illustrating a main memory area formed in a RAM of the scanner device.

These modules are realized by executing processing according to the commodity recognition program by the CPU 111 of the scanner device 1. The commodity recognition program is stored in, for example, the ROM 112. As shown in FIG. 4, the scanner device 1 forms a determined commodity memory 41, a confirmation commodity memory 42, a candidate commodity memory 43, a pattern memory 44 and a color memory 45 in the RAM 113 as the memory areas required to execute the processing.

All the determined commodity memory 41, the confirmation commodity memory 42 and the candidate commodity memory 43 have an area for storing the commodity ID and the later described similarity degree as a pair. Particularly, the determined commodity memory 41 and the confirmation commodity memory 42 store only one pair of commodity ID and similarity degree. On the other hand, the candidate commodity memory 43 can store a plurality of pairs of commodity ID and similarity degree. Specifically, the determined commodity memory 41 stores the similarity degree and the commodity ID of a commodity of which the similarity degree is greater than a first threshold value A. The confirmation commodity memory 42 stores the similarity degree and the commodity ID of a commodity of which the similarity degree is equal to or smaller than the first threshold value A and greater than a second threshold value B smaller than the first threshold value A. The candidate commodity memory 43 stores the similarity degree and the commodity ID of a commodity of which the similarity degree is equal to or smaller than the second threshold value B and greater than a third threshold value C smaller than the second threshold value B.

The pattern memory 44 stores pattern data obtained by patterning various shapes of the hand of the operator of the scanner device 1 when the operator holds the commodity over the reading window 1B. The hand of the operator is one reason why the commodity cannot be recognized by the recognition module. That is, there is a case in which the hand of the operator shields the commodity when the operator holds the commodity over the reading window 1B, and as a result, the commodity cannot be recognized. Thus, the pattern memory 44 is arranged in the present embodiment to specify such a reason.

The color memory 45 stores color data set for each reason when the commodity cannot be recognized. The reason why the commodity cannot be recognized further includes a reason that the position of the commodity is too far, or a reason that the position of the commodity is shifted, in addition to the reason that the hand of the operator shields the commodity. That is, there is a case in which the commodity cannot be recognized because the position of the commodity held over the reading window 1B is shifted from the image capturing area. There is a case in which the commodity cannot be recognized because the position of the commodity held over the reading window 1B is too far, and as a result, the resolution of the commodity image is low. Alternatively, there is a case in which the feature amount data of the commodity is not set in the recognize dictionary memory 30. In the present embodiment, the differences of these reasons can be recognized according to the differences of the colors of frame borders surrounding the recognition target object.

Figure 5:
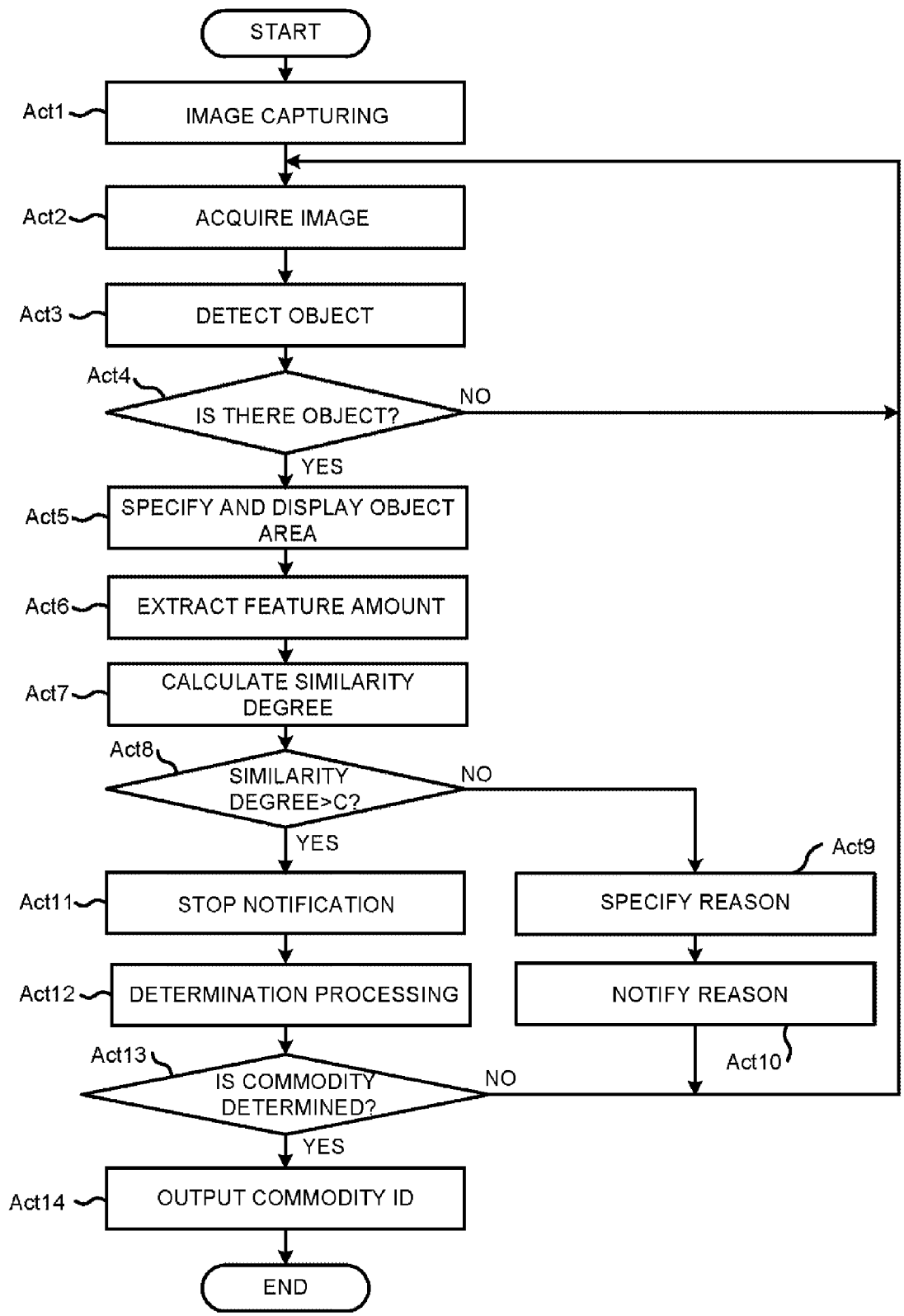
FIG. 5 is a flowchart illustrating the procedure of a main information processing executed by a CPU of the scanner device according to a commodity recognition program.

When the commodity recognition program is started, the CPU 111 starts the procedure shown in the flowchart in FIG. 5. The procedure of the processing described below including the procedure shown in FIG. 5 is just described as an example, and various processing procedures can be used properly to achieve the same result.

First, the CPU 111 outputs an ON-signal of image capturing to the image capturing section 14 (ACT 1). The image capturing section 14 starts to photograph the image capturing area according to the ON-signal of image capturing. The frame images of the image capturing area captured by the image capturing section 14 are stored in the RAM 113 in sequence.

After outputting the ON-signal of image capturing, the CPU 111 sequentially acquires the frame images stored in the RAM 113 and displays the images on the display 12a (ACT 2). The CPU 111 detects, from the frame image, the object imaged in the frame image (ACT 3: detection module). For example, the CPU 111 extracts a contour line and the like from the binary image of the frame image. Then the CPU 111 tries to extract the contour of the object imaged in the frame image. After the contour of the object is extracted, the CPU 111 regards that the object is detected from the frame image (ACT 4).

In a case in which the object cannot be detected from the frame image (NO in ACT 4), the CPU 111 returns to execute the processing in ACT 2. That is, the CPU 111 acquires a next frame image. Then the CPU 111 tries to detect the object from the frame image.

Figure 6:
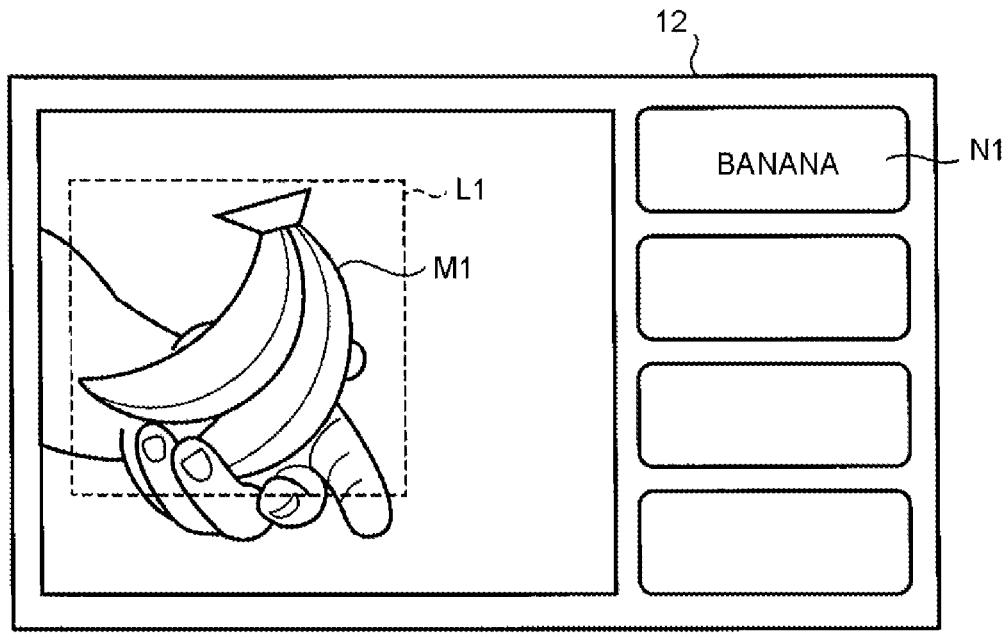
FIG. 6 is a schematic view illustrating an example of a screen of a touch panel when a commodity recognition operation is carried out.
Figure 7:
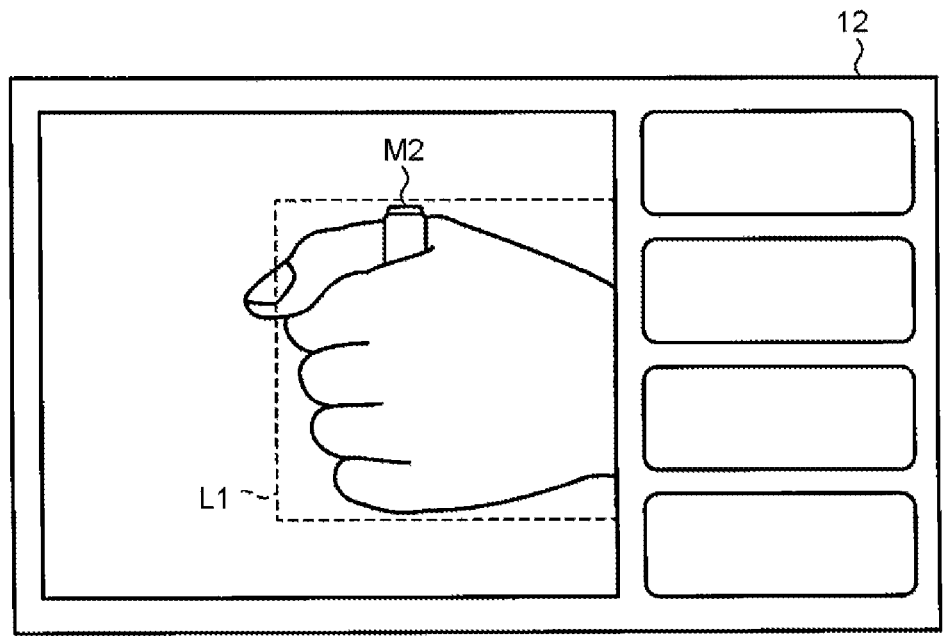
FIG. 7 is a schematic view illustrating an example of a screen of the touch panel when a commodity recognition operation is not carried out.

In a case in which the object is detected from the frame image (YES in ACT 4), the CPU 111 specifies, for example, a minimum rectangular-shaped image area containing the contour of the object as the image area of the object. Then as shown in FIG. 6 or FIG. 7, the CPU 111 displays a frame border L1 surrounding the image area of the object (ACT 5). The frame border L1 is formed in a rectangular shape in FIG. 6 or FIG. 7, however, the shape of the frame border L1 is not limited to this. The frame border L1 may be formed in a rhombus, circle or ellipse. Further, the frame border L1 is exemplified as a dotted line in FIG. 6 or FIG. 7, however, it is not limited to this, and the frame border L1 may be a solid line, one dotted line and the like.

After displaying the frame border L1, the CPU 111 extracts the appearance feature amount such as the shape, the surface tint, the pattern, the concave-convex state and the like of the object from the image in the area (ACT 6: extraction module).

After the appearance feature amount is extracted, the CPU 111 accesses the POS terminal 2 through the connection interface 115. Then the CPU 111 sequentially compares the appearance feature amount with the feature amount data of each recognition target commodity stored in the recognition dictionary file 30 to calculate the similarity degree with the appearance feature amount for each recognition target commodity (ACT 7: calculating module).

At this time, in a case in which a similarity degree greater than the first threshold value A is calculated, the CPU 111 writes the similarity degree and the commodity ID of the commodity into the determined commodity memory 41. In a case in which the data is already written in the determined commodity memory 41, the CPU 111 retains the data with the greater similarity degree in the determined commodity memory 41.

In a case in which a similarity degree equal to or smaller than the first threshold value A but greater than the second threshold value B is calculated, the CPU 111 writes the similarity degree and the commodity ID of the commodity into the confirmation commodity memory 42. In this case, if the data is already written in the confirmation commodity memory 42, the CPU 111 retains the data with the greater similarity degree in the confirmation commodity memory 42.

In a case in which a similarity degree equal to or smaller than the second threshold value B but greater than the third threshold value C is calculated, the CPU 111 writes the similarity degree and the commodity ID of the commodity into the candidate commodity memory 43. At this time, if the data is already written in the candidate commodity memory 43, the CPU 111 sorts the data in the candidate commodity memory 43 in the descending order of similarity degree.

The CPU 111 confirms whether or not the similarity degree greater than the third threshold value C is calculated (ACT 8: recognition module). In a case in which the data is not written in the determined commodity memory 41, the confirmation commodity memory 42 or the candidate commodity memory 43, the similarity degree greater than the third threshold value C is not calculated. In this case (NO in ACT 8), the CPU 111 specifies the reason why the commodity cannot be recognized (ACT 9: specification module).

Specifically, the CPU 111 sequentially compares the image in the area surrounded by the frame border L1 with each pattern data set in the pattern memory 44 to calculate a correspondence rate. For example, when a pattern data corresponding to the image at a probability as high as 80% is detected, the CPU 111 specifies that the reason why the commodity cannot be recognized is the hand of the operator.

On the contrary, for example, in a case in which the pattern data corresponding to the image at a probability as high as 80% is not detected, the CPU 111 measures the size of the area surrounded by the frame border L1. In a case in which the size is smaller than a preset minimum value, the CPU 111 specifies that the reason why the commodity cannot be recognized relates to the position of the commodity. In a case in which the size of the area surrounded by the frame border L1 is greater than the minimum value, the CPU 111 specifies that the reason is that the data is not set in the recognize dictionary memory 30. In ACT 9, the CPU 111 may first determine whether or not the size of the area surrounded by the frame border L1 is smaller than the minimum value, and then execute the processing of comparing with each pattern data in the pattern memory 44 to specify the reason if the size is smaller than the minimum value.

After the reason why the commodity cannot be recognized is specified, the CPU 111 detects the color data set for the reason by reference to the color memory 45. Then the CPU 111 changes the color of the frame border L1 to the color of the color data (ACT 10: notification module).

Sequentially, the CPU 111 returns to ACT 2 to acquire a next frame image. Then the CPU 111 executes the processing following ACT 3 again.

In a case in which a similarity degree greater than the third threshold value C is calculated (YES in ACT 8), the CPU 111 stops the notification processing carried out in ACT 10 (ACT 11) Sequentially, the CPU 111 executes a determination processing (ACT 12). The content of the determination processing varies in a case in which the data is written in the determined commodity memory 41, in a case in which the data is written in the confirmation commodity memory 42, and in a case in which the data is written in the candidate commodity memory 43.

In a case in which the data is written in the determined commodity memory 41, the CPU 111 determines the commodity specified with the commodity ID stored in the determined commodity memory 41 as the commodity held over the reading window 1B. Then the CPU 111 generates a voice from the speaker 17 to notify that the commodity is determined.

In a case in which the data is written in the confirmation commodity memory 42, the CPU 111 displays, on the display 12*a*, an image of a name button which displays the name of the commodity specified with the commodity ID stored in the confirmation commodity memory 42 in a button frame. Then the CPU 111 waits until the name button is touched. When it is detected that the name button is touched according to the signal detected by the touch panel sensor 12*b*, the CPU 111 determines the commodity specified with the commodity ID stored in the confirmation commodity memory 42 as the commodity held over the reading window 1B. Then the CPU 111 generates a voice from the speaker 17 to notify that the commodity is determined. On the contrary, in a case in which it is detected that a screen area other than the name button is touched, the CPU 111 deletes the image of the name button. At this time, the commodity is not determined.

In a case in which the data is written in the candidate commodity memory 43, the CPU 111 displays, on the display 12*a*, the images of name buttons which display the names of the commodities specified with the commodity IDs stored in candidate commodity memory 43 in button frames. Then the CPU 111 waits until any of the name buttons is touched. When it is detected that one name button is touched according to the signal detected by the touch panel sensor 12b, the CPU 111 determines the commodity corresponding to the name displayed in the name button as the commodity held over the reading window 1B. Then the CPU 111 generates a voice from the speaker 17 to notify that the commodity is determined. On the contrary, in a case in which it is detected that an area other than the name button is touched, the CPU 111 deletes the image of the name button. At this time, the commodity is not determined.

The CPU 111 determines whether or not the commodity is determined (ACT 13). In a case in which the commodity is not determined (NO in ACT 13), the CPU 111 returns to ACT 2 to acquire a next frame image. Then the CPU 111 executes the processing following ACT 3 again.

In a case in which the commodity is determined (YES in ACT 13), the CPU 111 outputs the commodity ID of the determined commodity to the POS terminal 2 through the connection interface 115 (ACT 14).

Now assume that the shop clerk holds an object M1 over the reading window 1B as shown in FIG. 6. In this case, almost the entire object M1 is photographed by the image capturing section 14. In the scanner device 1, the rectangular-shaped frame border L1 indicated by a dotted line is displayed on the touch panel 12 in a manner of surrounding the recognition area of the object. The appearance feature amount of the object M1 is extracted and compared with the feature amount data of each commodity stored in the recognition dictionary file 30.

Herein, it is assumed that the feature amount data of which the similarity degree with the appearance feature amount of the object M1 is greater than the first threshold value A is set in the recognition dictionary file 30 as the feature amount data of a commodity "banana". In this case, it is determined in the scanner device 1 that the object M1 held over the reading window 1B is the commodity "banana", and the commodity ID of the commodity "banana" is output to the POS terminal 2. As a result, the sales data of the commodity "banana" is registered in the POS terminal 2.

In a case in which the similarity degree between the feature amount data of the commodity "banana" and the appearance feature amount of the object M1 is greater than the second threshold value B but smaller than the first threshold value A, as shown in FIG. 6, a button image Ni of the commodity "banana" is displayed on the touch panel 12 in the scanner device 1. If the shop clerk touches the button image Ni, the commodity ID of the commodity "banana" is output to the POS terminal 2. As a result, the sales data of the commodity "banana" is registered in the POS terminal 2.

On the other hand, assume that the shop clerk holds an object M2 over the reading window 1B in a state in which the object M2 is almost entirely shield by the hand of the shop clerk, as shown in FIG. 7. In this case, the entire back of the hand including the object M2 is recognized as one object in the scanner device 1. Then in the scanner device 1, the rectangular-shaped frame border L1 indicated by a dotted line is displayed on the touch panel 12 in a manner of surrounding the recognition area of the object. The appearance feature amount of the object is extracted and compared with the feature amount data of each commodity stored in the recognition dictionary file 30.

At this time, the feature amount data of which the similarity degree with the appearance feature amount of the object is greater than the third threshold value C is not set in the recognition dictionary file 30 in most cases. In this case, conventionally, there is no change in the screen of the touch panel 12. There is no voice generated from the speaker, either. That is, the commodity recognition apparatus has no reaction. Thus, the shop clerk cannot determine whether the commodity is being recognized or the commodity cannot be recognized, which makes the shop clerk feel stress.

Figure 8:
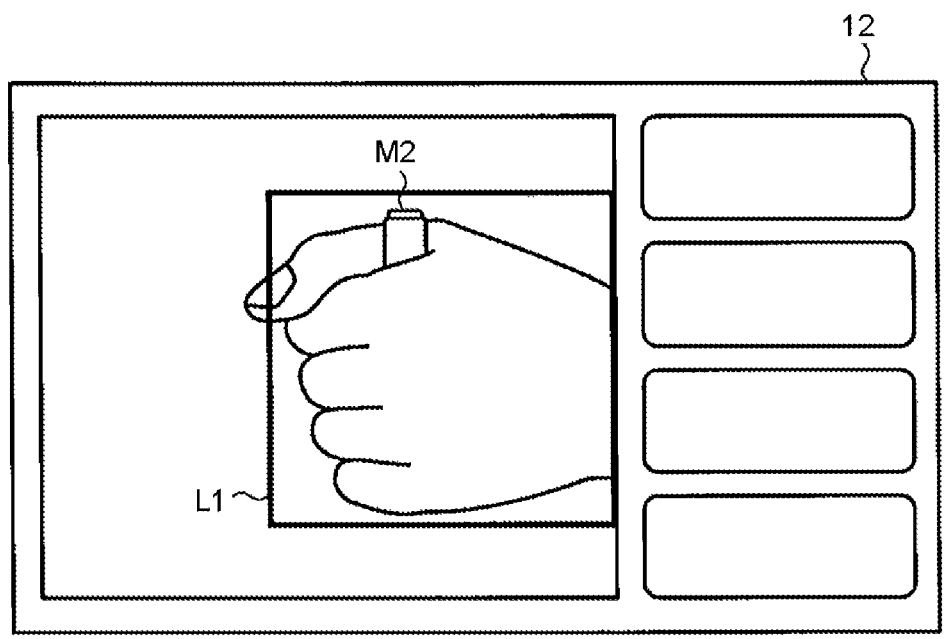
FIG. 8 is a schematic view illustrating an example of a notification screen in a case in which an object is not recognized as a commodity.

On the contrary, as shown in FIG. 8, the line type of the frame border L1 is changed from the dotted line to a solid line in the present embodiment. The color Of the frame border L1 is also changed to a color corresponding to the reason why the commodity cannot be recognized. For example, it is assumed in the scanner device 1 that the image in the area surrounded by the frame border L1 is sequentially compared with each pattern data set in the pattern memory 44, and as a result, a pattern data corresponding to the image at a high probability is detected. In this case, it is specified in the scanner device 1 that the hand of the shop clerk is the reason why the commodity cannot be recognized. Then the color of the frame border L1 is changed to a color (for example, red) corresponding to the reason.

In this way, as the color of the frame border L1 is changed to red, the shop clerk is aware that the commodity Ni cannot be recognized because his/her hand shields the commodity Ni. At this time, the shop clerk holds the commodity Ni over the reading window 1B in a manner that the commodity Ni is not shield by the hand, thus, the shop clerk does not feel stress.

On the other hand, though the commodity is held over the reading window 1B, there is a case in which the commodity cannot be recognized because the position of the commodity is too far from the reading window 1B, and as a result, the resolution of the commodity image is low. In this case, as the size of the commodity image area is smaller than the preset minimum value, thus, it is specified in the scanner device 1 that the reason why the commodity cannot be recognized is the position of the commodity. Then the color of the frame border L1 is changed to a color (for example, green) corresponding to the reason. In this way, as the color of the frame border L1 is changed to green, the shop clerk is aware that the commodity cannot be recognized because the commodity is too far from the reading window n. At this time, the shop clerk only needs to move the commodity closer to the reading window 1B, thus, the shop clerk does not feel stress.

Further, there is a case in which the commodity cannot be recognized because the feature amount data of the commodity is not registered in the recognition dictionary file 30. In this case, the color of the frame border L1 is changed to, for example, yellow. In this way, as the color of the frame border L1 is changed to yellow, the shop clerk is aware that the commodity cannot be recognized because the feature amount data of the commodity is not registered in the recognition dictionary file 30. In this case, for example, the shop clerk only needs to operate the keyboard 11 of the scanner device 1 to register the commodity through manual input, thus, the shop clerk does not feel stress.

As stated above, in accordance with the present embodiment, the rectangular-shaped frame border L1 is displayed on the touch panel 12 in a manner of surrounding the recognition area of the object. When the object cannot be recognized, the color of the frame border L1 is changed. As a result, as the color of the frame border L1 is changed, thus, the operator can easily be aware why the commodity cannot be recognized. There is another advantage that the operator can confirm that the program is not frozen.

The present invention is not limited to the embodiment described above.

For example, it is exemplified in the embodiment described above that not only is the color of the frame border L1 changed, but also the line type of the frame border L1 is changed from the dotted line to the solid line in a case in which the object cannot be recognized, however, the line type may be remained to be the dotted line or the solid line without being changed.

Figure 9:
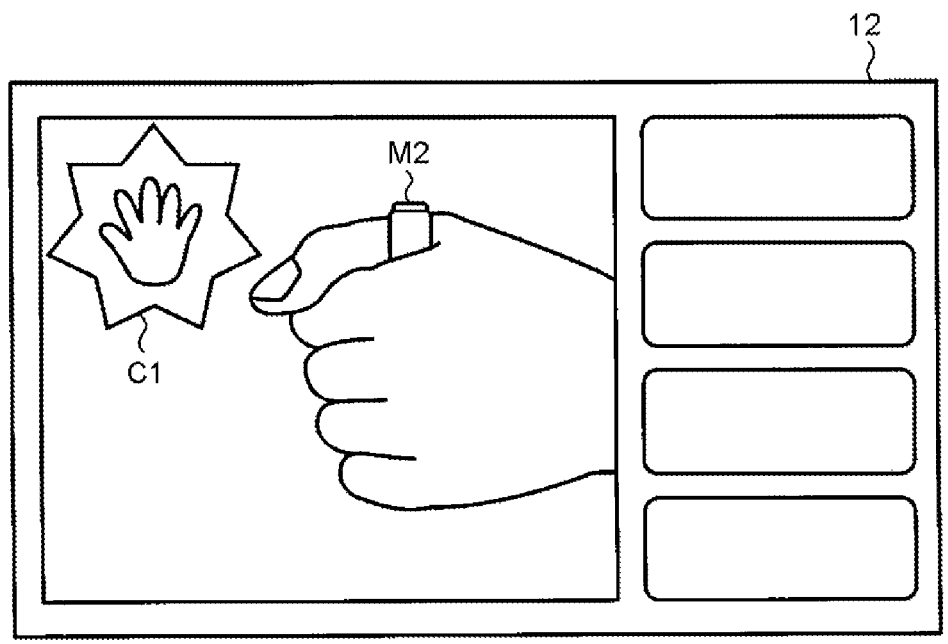
FIG. 9 is a schematic view illustrating another example of the notification screen in a case in which an object is not recognized as a commodity.

Further, the reason why the object cannot be recognized may be notified in a display form other than the frame border. For example, as shown in FIG. 9, the operator may be notified of the reason by displaying an icon C1 on the display 12. Incidentally, FIG. 9 shows an example of an icon which is displayed when the commodity cannot be recognized because the hand of the operator shields the commodity. For example, in a case in which the commodity cannot be recognized because the commodity is too far from the reading window B, an icon of a mark "?" is displayed. In this way, the operator can easily be aware of the reason why the object cannot be recognized.

Figure 10:
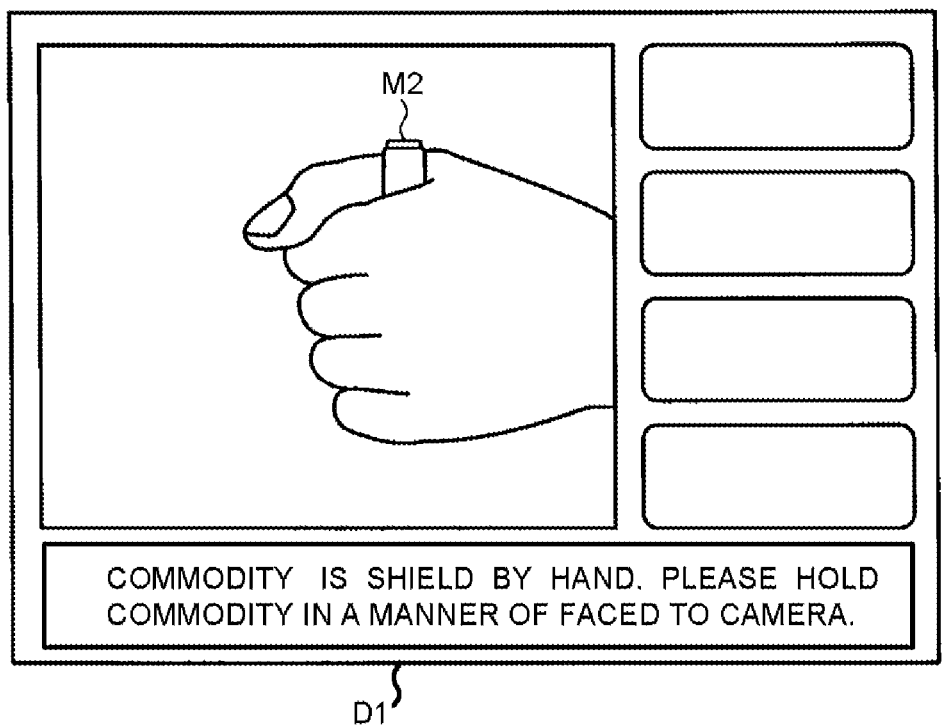
FIG. 10 is a schematic view illustrating another example of the notification screen in a case in which an object is not recognized as a commodity.

As shown in FIG. 10, the operator may be notified of the reason by displaying a message D1 indicating the reason. In this case, the message D1 may be given through a voice under the action of the speech synthesis section 118. Further, the message D1 may be given by both voice and display.

For example, it is also applicable to display the frame border surrounding the image area of the object or change the color of the frame border when the reason is the position of the object, and to display an icon when the reason is the shielding by the hand, and vice versa.

The present invention is not limited to the commodity recognition apparatus in which the general object recognition technology is applied. For example, the present invention may also be applied to a commodity recognition apparatus which detects a barcode image from an image captured by an image capturing module and decodes the barcode of the barcode image to recognize a commodity.

Further, the method of recognizing the hand of the operator is not limited to the pattern recognition. For example, it may be recognized that the reason is the hand of the operator in a case in which the ratio of a flesh color area to the image area is greater than a given ratio.

In addition, the transfer of the commodity recognition apparatus is generally carried out in a state in which the programs such as commodity recognition program are stored in the ROM. However, the preset invention is not limited to this. The commodity recognition program and the like transferred separately from a computer device may be written in a writable storage device of the computer device through an operation of a user and the like. The transfer of the commodity recognition program and the like may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus comprising:
   an image sensor which has an area image sensor to photograph a commodity and generate a captured image of the commodity;
   a first memory configured to store an image of a hand;
   a second memory configured to store computer-readable instructions; and
   a central processing unit which processes the captured image according to the computer-readable instructions causing the commodity recognition apparatus to:
   recognize the commodity imaged as one object in the captured image;
   compare the captured image with the image of the hand and recognize a shape of a hand as another object in the captured image;
   specify a reason why the commodity cannot be recognized is that a shape of the commodity is almost entirely shielded by a hand of an operator when the shape of the hand is recognized in the captured image; and
   notify the operator of the reason specified.

2. The commodity recognition apparatus according to claim 1, further comprising:
   a display configured to display the image captured by the image sensor; wherein
   the image sensor is configured to photograph a commodity held over a reading window by the operator; and
   the notification displays an image that notifies the reason specified and that overlaps the image displayed on the display module.

3. The commodity recognition apparatus according to claim 1, further comprising:
   a display module configured to display the image captured by the image sensor; wherein
   the image sensor is configured to photograph a commodity held over a reading window by the operator; and
   the notification displays an image that notifies the reason specified and that overlaps the image displayed on the display.

4. The commodity recognition apparatus according to claim 1, further comprising a display configured to display the image captured by the image sensor, wherein
   the image through which the reason can be recognized is a frame border surrounding the objects contained in the image captured by the image sensor, and the reason can be recognized according to the category of the frame border.

5. The commodity recognition apparatus according to claim 1, further comprising a display configured to display the image captured by the image sensor, wherein
   the image through which the reason can be recognized is an icon, and the reason can be recognized according to the category of the icon.

6. The commodity recognition apparatus according to claim 4, wherein a color of the frame border is changed according to the reason.

7. The commodity recognition apparatus according to claim 4, wherein the frame border is shaped in one of a group of rhombus, circle, rectangle, and ellipse according to the reason.

8. The commodity recognition apparatus according to claim 4, wherein the frame border is formed by a dotted line or solid line according to the reason.

9. The commodity recognition apparatus according to claim 1, further comprising a display configured to display one or more buttons corresponding to names of one or more candidate commodities, wherein in response to receiving a selection of one of the buttons, the commodity recognition apparatus further generates an audio voice to notify the operator the commodity has been determined.

10. The commodity recognition apparatus according to claim 6, wherein the specified reason as to why the commodity cannot be recognized is that the shape of the commodity is almost entirely shielded by the hand of the operator, or that a position of the commodity is too far from a reading window, and wherein
    the color of the frame border is changed to a first color when is it determined the commodity is almost entirely shielded by the hand of the operator, and
    the color of the frame border is changed to a second color when is it determined that the position of the commodity is too far from the reading window.

\* \* \* \* \*